United States Patent [19]

Maeda

[11] Patent Number: 4,902,860
[45] Date of Patent: Feb. 20, 1990

[54] AUTOMATIC CANCELING DEVICE FOR WINKER DEVICE

[75] Inventor: Takuya Maeda, Furukawa, Japan

[73] Assignee: Alps Electric Co., Ltd., Tokyo, Japan

[21] Appl. No.: 311,923

[22] Filed: Feb. 16, 1989

[30] Foreign Application Priority Data

Apr. 28, 1988 [JP] Japan .............................. 63-56741[U]

[51] Int. Cl.⁴ ........................ H01H 3/16; H01H 9/00; B60Q 1/42
[52] U.S. Cl. ................................ 200/61.27; 335/173
[58] Field of Search .................... 200/12, 61.27–61.38, 200/61.54; 335/173; 340/475–477

[56] References Cited

U.S. PATENT DOCUMENTS

| | | | |
|---|---|---|---|
| 1,950,225 | 3/1934 | Burton | 335/173 |
| 2,824,917 | 2/1958 | Hollins | 340/477 X |
| 2,924,680 | 2/1960 | Swenson | 200/12 X |
| 4,058,797 | 11/1977 | Sekiguchi et al. | 200/61.27 X |
| 4,097,700 | 6/1978 | Okazaki | 200/61.27 |
| 4,125,827 | 11/1978 | Roudebush, Jr. | 200/61.27 X |
| 4,620,177 | 10/1986 | Hatanaka et al. | 340/475 |

FOREIGN PATENT DOCUMENTS 51-53175 12/1976 Japan .

Primary Examiner—J. R. Scott
Attorney, Agent, or Firm—Guy W. Shoup; Stephen L. Malaska; Paul J. Winters

[57] ABSTRACT

An automatic canceling device for a winker which comprises a container, a winker operation lever rockably held in the container, an engaging unit extensibly or contractibly provided through a compression spring mounted in the lever, a locking cam provided in the container for holding the lever engaged with the engaging unit at neutral, right or left positions, a solenoid energized by an unlock signal, an unlocking member for rotating the lever in the unlocking direction in contact with the second cam unit provided on the lever, and an energizing member engaged with the unlocking member for energizing the locking cam toward its neutral position. Thus, the automatic canceling device can hold the compression spring at a neutral position without fluctuation even if the spring tension of the spring is small, and reduce the size and the cost of the solenoid by reducing the operating force in case of unlocking.

4 Claims, 7 Drawing Sheets

AUTOMATIC CANCELING DEVICE FOR WINKER DEVICE

BACKGROUND OF THE INVENTION

1. Field of the Invention

This invention relates to an automatic canceling device for a winker and, more particularly, to an automatic canceling device for a winker of electric type for unlocking by the attraction of a solenoid even if a winker operation knob is disposed at a position separate from a steering shaft.

2. Description of the Prior Art

Figure 6A:
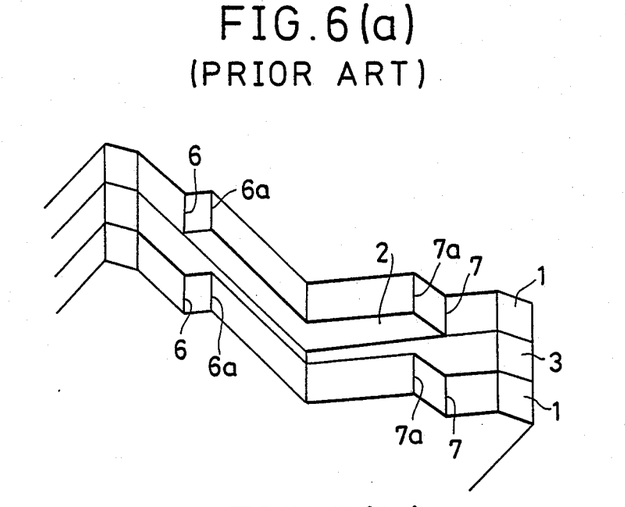
FIGS. 6(a) and 6(b) are perspective views of essential portions showing the locking and unlocking states of the cam section of an automatic canceling device for a conventional winker.
Figure 6B:
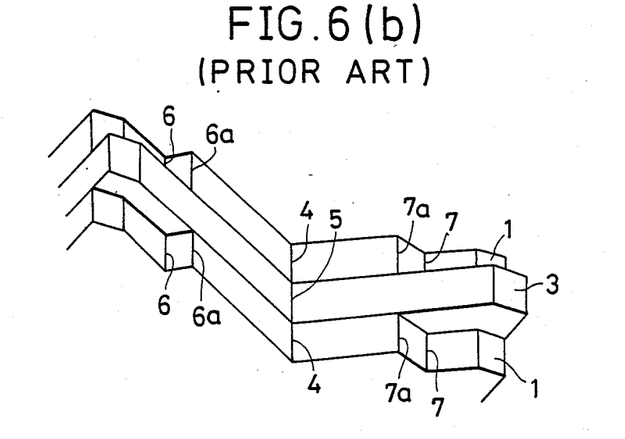

In an automatic canceling device or an electric type winker of this type, a winker operation lever rotated by an operation knob is generally rockably provided in a case. A driving rod is slidably held through a compression spring at the lever, and pressed under pressure with an opposite cam. The cam has, as shown in FIGS. 6(a) and 6(b), a stationary cam unit 1, and an elevationally movable cam unit 3 disposed in a slit 2 formed at the center of the cam unit 1. Grooves 4 and 5 are respectively formed at the cam units 1 and 3 for holding the winker operation lever at its neutral position, and locking grooves 6 and 7 are formed at the cam unit 1 for holding the winker operation lever at the left and right positions. The movable cam unit 3 is urged downward by a spring, and unlocked, i.e., moved upward by a solenoid energized by an unlock signal, for example, due to the returning rotation of the steering wheel.

The operation of the automatic canceling device for the conventional winker constructed as described above will be described.

FIG. 6(a) shows a cam portion such that the winker operation lever is locked at left or right position. In the state shown in FIG. 6(a), the movable cam unit 3 is retracted so that the plane of the groove 5 is disposed at the same as the plane of the grooves 6 and 7 for locking the stationary cam unit 1, a driving rod of the winker operation lever is, though not shown, engaged with the groove 6 or 7, and the winker operation lever is locked at the left or right position. Thus, left or right winker is intermittently flashed.

When the steering wheel is rotatably returned, a switch is actuated by the cam of the steering shaft to energize the solenoid. The movable cam unit 3 is moved upward against a compression spring by the energization of the solenoid, and the plane of the groove 5 of the movable cam unit 3 is disposed in the same plane as that of the groove 4 of the stationary cam unit 1 as shown in FIG. 6(b). Then, the driving rod engaged with the groove 6 or 7 is moved to the ends 6a, 7a of the center side of the groove 6 or 7 while being pressed by the groove 5 of the movable cam unit 3, to ride over the ends 6a, 7a of the center side in the state as shown in FIG. 6(b) to be moved to and held in the grooves 4, 5 of neutral position. Then, the solenoid is deenergized, the movable cam unit 3 is moved down by the spring, and returned to the state as shown in FIG. 6(a). In this case, even if the groove 5 of the movable cam 3 is moved down to become the state not contacted with the driving rod, the driving rod is engaged with the groove 4 of the stationary cam unit 1, and the winker operation lever is held at its neutral position.

However, in the prior art described above, in order to dispose the winker operation lever at its neutral position without fluctuation, the compression spring for pressing the driving rod in contact with the groove 4 of the cam needs a spring tension of predetermined degree. Accordingly, when the driving rod is engaged with the left or light grooves 6 or 7, the spring tension further increases. Since the movable cam unit 3 is moved upward to press the driving rod against the compression spring by the energization of the solenoid in this state, the spring tension of the compression spring in case of unlocking is increased, a large solenoid is required to move upward the movable cam unit 3 against the spring tension which prevents the reduction in its size and enhance its cost.

SUMMARY OF THE INVENTION

Accordingly, an object of this invention is to provide an automatic canceling device for a winker which can eliminate the above-described disadvantages of the prior art and which can hold a compression spring at a neutral position without fluctuation even if the spring tension of the spring is small, and reduce the size and the cost of a solenoid by reducing the operating force needed for unlocking.

In order to achieve the above and other objects of the invention, there is provided according to the present invention an automatic canceling device for a winker comprising a case, a winker operation lever rockably held at the case, an engaging unit extensibly or contractibly provided through a compression spring at the lever, a locking cam provided at the case for holding the lever engaged with the engaging unit at the neutral, right or left position, a solenoid energized by an unlock signal, an unlocking member for rotating the lever in the unlocking direction in contact with the cam unit provided at the lever, and an energizing member engaged with the unlocking member for energizing the locking cam toward its neutral position.

The energizing force of the energizing member is applied through the unlocking member to the winker operation lever by the above-described means to act as a force for holding the winker operation lever at its neutral position. Thus, the spring tension of the compression spring for similarly holding it at its neutral position can be weakened to hold it without fluctuation. Thus, a frictional force between the engaging unit and the cam is weakened in order to conduct the winker operation by a light touch. In case of unlocking, the driving force of the solenoid for fluctuating the winker operation lever may be small thereby reducing the size of the solenoid. Further, since the winker operation lever is rotated in its unlocking direction by the operation of the unlocking member, the solenoid does not directly press the compression spring, and a large force for pressing the compression spring is not required. Thus, since the solenoid for operating the unlocking member may produce a small force, the solenoid can be reduced in size to decrease its cost. In this manner, the size of the automatic canceling device for the winker can be reduced to decrease its cost.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

An embodiment of the present invention will be described in detail with reference to FIGS. 1 to 5.

Figure 1A:
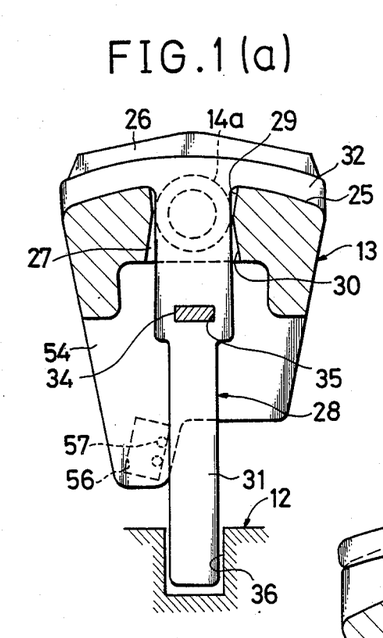
FIGS. 1(a), 1(b), 1(c) and 1(d) are sectional views of essential portion showing the states of the neutral position, left or right position unlocking midway and lane change of an automatic canceling device for a winker according to the present invention.
Figure 1B:
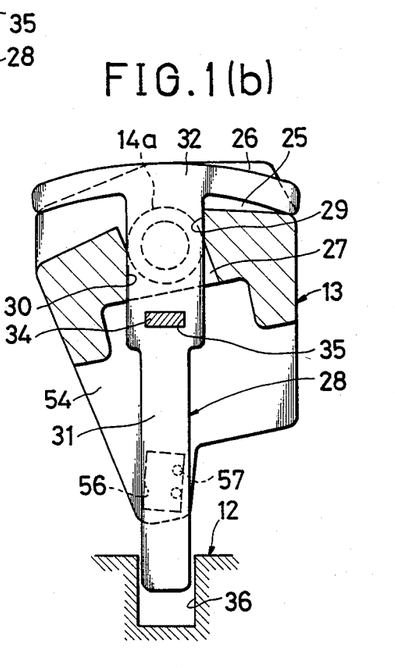
Figures 1C, 1D:
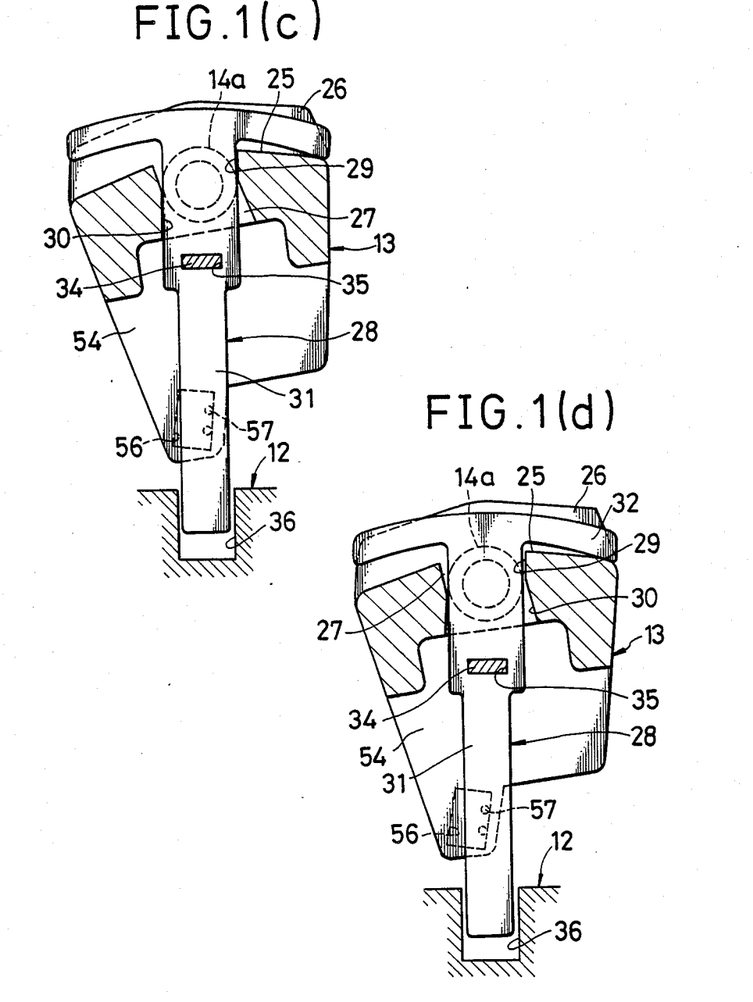
Figure 2:
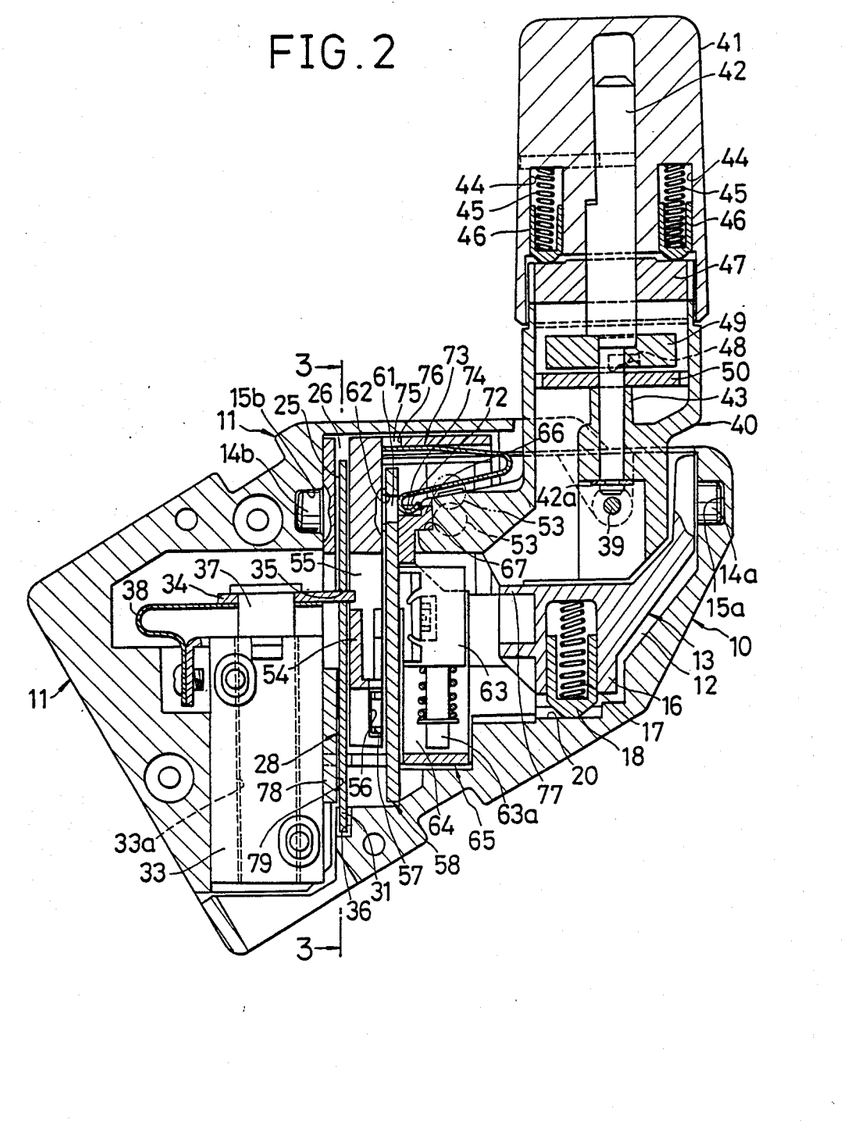
FIG. 2 is a longitudinal sectional view of the automatic canceling device.
Figure 3:
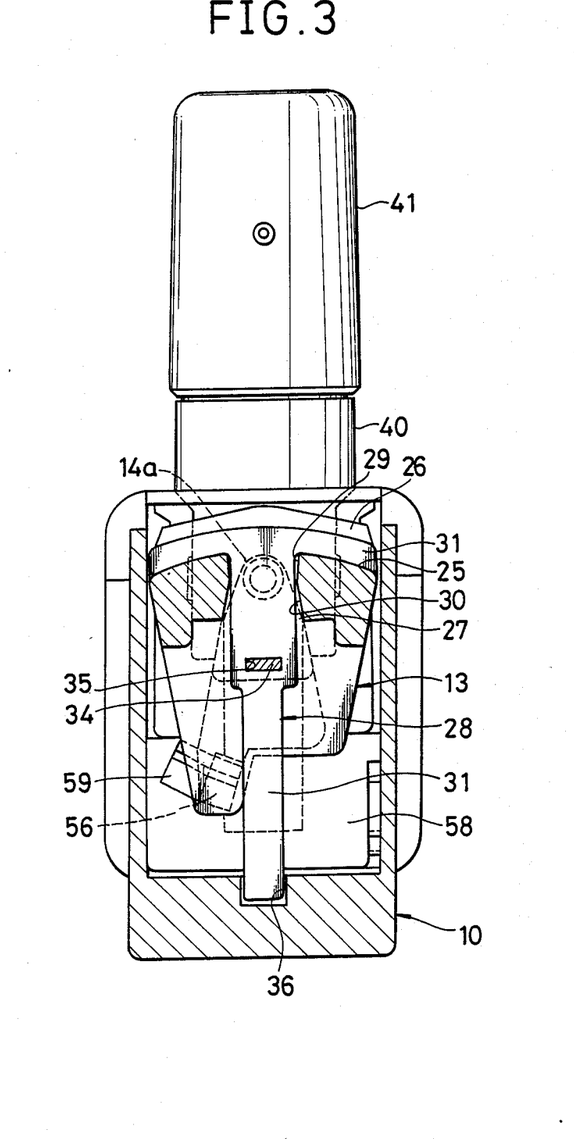
FIG. 3 is a sectional view taken along the line 3—3 of FIG. 2.
Figure 4:
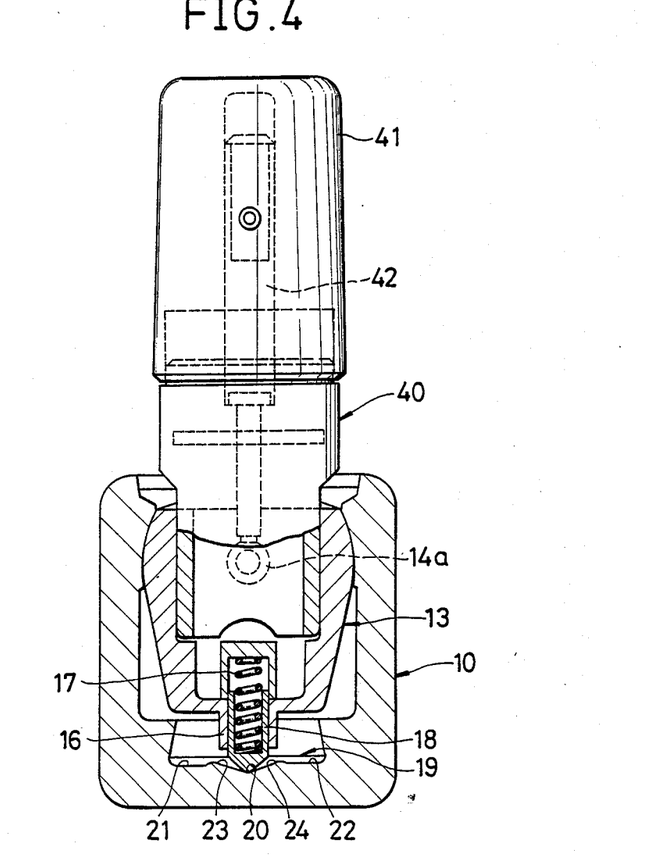
FIG. 4 is a partial fragmentary left side view of the automatic canceling device.
Figure 5:
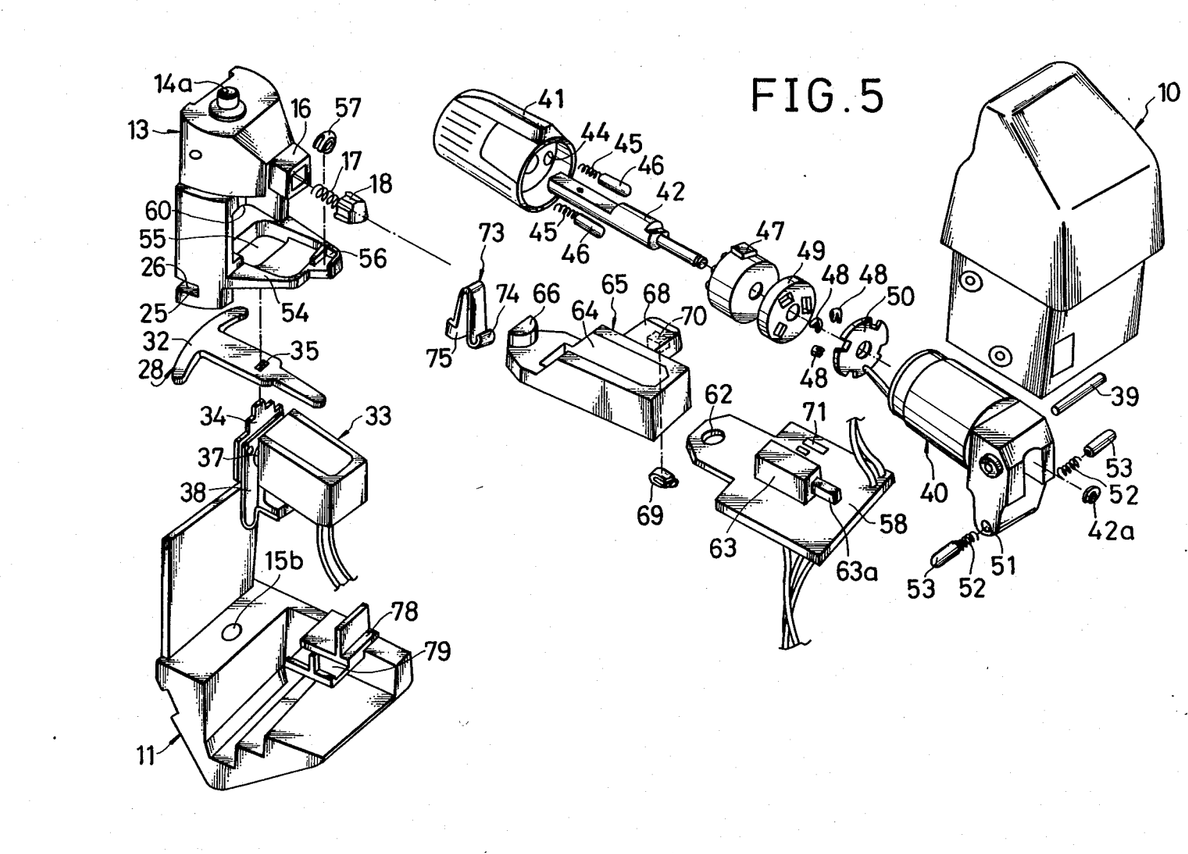
FIG. 5 is an exploded perspective view of the automatic canceling device.

FIGS. 1(a), 1(b), 1(c) and 1(d) are sectional views of essential portion showing the states of the neutral position, left or right position unlocking midway and lane change of an automatic canceling device for a winker according to the present invention, FIG. 2 is a longitudinal sectional view of the automatic canceling device, FIG. 3 is a sectional view taken along the line 3—3 of FIG. 2, FIG. 4 is a partial fragmentary left side view of the automatic canceling device, and FIG. 5 is an exploded perspective view of the automatic canceling device.

In the drawings, reference numerals 10 and 11 denote cases. Both the cases 10 and 11 are associated, clamped with screws and formed in a box shape to provide a container 12. A winker operation lever 13 is rockably provided in the container 12. The lever 13 is engaged at both end faces at rockable shafts 14a and 14b with supporting holes 15a and 15b formed on the opposed inner surfaces of the cases 10 and 11. A square-sectional cylindrical holder 16 is protruded at the lower movable end of the lever 13, and a driving shaft 18 of an engaging unit is inserted through a compression spring 17 to the holder 16. The lower end of the driving shaft 18 is pressed by the compression spring 17 to a cam 19 formed on the inner bottom of the case 10. The cam 19 is formed of a groove 20 for holding driving shaft 18 at its neutral position, grooves 21 and 22 for holding it at left and right positions at both sides of the groove 20, and steps 23 and 24 for engaging it at the time of lane changing. A second cam unit 25 is formed in the vicinity of the rockable shaft 14b of the lever 13 with a groove 26 along the rocking direction of the lever 13 on the upper surface of the lever 13 as shown in FIGS. 2 and 3, and the bottom of the groove 26 is formed in an arcuate shape. An insertion hole 27 is formed at the center of the cam 25 toward its downward direction, and an unlocking member 28 is inserted into the insertion hole 27. Tapered portions 29 and 30 extended at upper and lower openings are formed on the opposed inner walls of the insertion hole 27, the unlocking member 28 is contacted with the tapered portions 29 and 30 at the time of fluctuating the lever 13 to restrict the fluctuating range of the lever 13. The unlocking member 28 is formed substantially in a T shape with a long slide plate portion 31, an arcuate contacting portion 32 formed to coincide with the shape of the cam 25 at one end of the slide plate portion 31, and an engaging hole 35 opened substantially at the center of the slide plate 31 to be inserted with the actuation piece 34 of a solenoid 33. The unlocking member 28 is inserted into the insertion hole 27 of the lever 13, and the lower end of the slide plate 31 is further inserted into a guide hole 36 formed at the bottom of the case 10 to guide the unlocking member 28 elevationally movably upward or downward. The solenoid 33 is contained in the container 12, and clamped with screws at the case 11. The solenoid 33 is formed with an actuation shaft 37 in its guide cylinder 33a, and an actuation piece 34 is attached to the end of the actuation shaft 37. Numeral 38 denotes a leaf spring of an energizing member. The leaf spring 38 is clamped at its one end to the side of the solenoid 33, and fixed at the other end to the lower surface of the actuation piece 34. The unlocking member 28 is energized downward through the actuation piece 34 by the tension of the leaf spring 38, and pressed at the contacting portion 32 thereof to the cam 25.

A supporting shaft 39 is supported to the winker operation lever 13 in a direction perpendicular to the coaxial direction of the rockable shafts 14a and 14b. A substantially L-shaped passing lever 40 is rotatably attached at its bent portion to the supporting shaft 39, and protruded at its one end upward from the opening of the case 10. An operation knob 41 is rotatably attached to the protrusion of the passing lever 40. The operation knob 41 is engaged integrally with one end of a rotational shaft 42, and supported at the other end to the bearing 43 of the passing lever 40 so as not to remove therefrom by a washer 42a. The operation knob 41 is formed with a round hole 44, and an adjusting rod 46 is slidably inserted through a coiled spring 45 to the round hole 44. The protruding end of the adjusting rod 46 is pressed in contact with a cam plate 47 formed with an adjusting groove, and the cam plate 47 is fastened to the passing lever 40. A slider container 49 for containing a slider 48 is integrally attached to the rotational shaft 42, and a substrate 50 on which the slider 48 slides is so attached to the passing lever 40 as not to rotate. The substrate 50 is formed with switching contacts for auxiliary lamps and headlamps. The slider 48 is rotated with the rotational shaft 42 as a center by the rotating operation of the operation knob 41 to switch the switching contacts on the substrate 50. Containing holes 51 are formed at the movable end of the passing lever 40 in the container 12 in the same direction as that of the supporting shaft 39 at both sides, and driving rods 53 are contained through coiled springs 52 in the holes 51. The rods 53 are pressed by the coiled springs 52 to the inside of the case 10.

A rotary plate 54 is extended downward adjacent to the insertion hole 27 of the winker operation lever 13. A window 55 for releasing the actuation piece 34 protruded from the engaging hole 35 of the unlocking member 28 is formed at the rotary plate 54. A recess 56 is formed at the movable end of the rotary plate 54, and a slider 57 is attached to the recess 56. The slider 57 slides on the left and right winker switching contacts 59 formed at one side surface of the substrate 58 provided in parallel. The substrate 58 is inserted into a space 60 formed in the winker operation lever 13, and a protrusion 61 protruded in the space 60 is engaged with the round hole 62 at the upper end of the substrate 58. A push-push type dimmer switch 63 is fixed by soldering to the other side surface of the substrate 58, and a slider 65 formed with a long hole 64 for containing the switch 63 is guided on the outer surface of the switch 63 to slide on the substrate 58. A semicircular engaging shaft 66 is protruded from the upper end of the slider 65 so that the axial center of the engaging shaft 66 coincides with those of the rockable shafts 14a and 14b. The peripheral surface of the shaft 66 is engaged with an engaging recess 67 formed on the movable end of the passing lever 40, and the slider 65 is moved upward by the operation of the passing lever 40 clockwise (in FIG. 2). When the passing lever 40 is rotated to the position of the driving rod 53 as designated by imaginary lines, the operation lever 63a of the switch 63 is pressed by the slider 65 to switch its contacts, the operation lever 63a of the switch 63 is again pressed by the same operation to switch its contacts to the original position. A protrusion 68 is protruded from the side of the slider 65, and a recess 70 for mounting a slider 69 is formed on the opposed surface of the protrusion 68 to the substrate 58. The slider 69 rocks on a passing contact 71 formed on the substrate 58 to turn the passing signal ON, OFF the passing. The passing operation is conducted by rotating the passing lever 40 to the midway, and the switch 63 is not operated in this state. A recess 72 is formed at the upper end of the slider 65, and one end 74 of a substantially V-shaped leaf spring 73 is engaged with the recess 72. The other end 75 of the leaf spring 73 is engaged with a holding hole 76 formed at the upper surface of the winker operation lever 13. The slider 65 is energized downward by the tension of the leaf spring 73, the engaging shaft 66 of the slider 65 is pressed to the engaging recess 67, and the passing lever 40 is contacted with the stopper 77 on the bottom of the winker operation lever 13 so as to stop rotating.

Numeral 78 denotes an extension piece extended from the side of the case 11, and formed with a groove 79 for guiding the slide plate 31 of the unlocking member 28.

The operation of the embodiment constructed as described above will be described.

The winker operation lever 13 is held in such a manner that the driving shaft 18 is pressed in contact with the groove 20 of the cam 19 by the compression spring 17 as shown in FIG. 4 in the neutral position shown in FIG. 1(a). Simultaneously, the contacting portion 32 of the unlocking member 28 is pressed by the leaf spring 38 and thereby maintained in contact with the cam 25 of the winker operation lever 13. Thus, a force for holding unlocking member 28 at a neutral position is acted at the winker operational lever 13 to eliminate the fluctuation thereof. As shown in FIG. 1(a), the slider 57 of the rotary plate 54 is disposed at the center of the left and right winker switching contacts 59 of the substrate 58, and both the left and right winkers do not flash.

When the right winker is intermittently flashed, for example, from the position shown in FIG. 1(a), the operation knob 41 is operated counterclockwise in FIG. 3 to rotate the winker operation lever 13. The cam 25 of the winker operation lever 13 is inclined by this rotating operation. Both the edges of the slide plate 31 of the unlocking member 28 are contacted with the tapered portions 29 and 30 of the insertion hole 27 which stops the rotation. As shown in FIG. 1(b), the right end of the cam 25 is moved upward to lift the contacting portion 32 of the unlocking member 28. In this case, the unlocking member 28 is guided at the slide plate 31 through the insertion hole 27 and the guide hole 36, etc. As shown in FIG. 1(b), the downward energizing force to the unlocking member 28 generated by the leaf spring 38 is increased. In the state in FIG. 1(b), the driving shaft 18 shown in FIG. 4 is moved counterclockwise to ride over the step 24 to be pressed by the compression spring 17 into the groove 22, thereby holding the winker operation lever 13 in place. Accordingly, it is so set that the holding force generated by the compression spring 17 is larger than the returning force of the winker operation lever 13 generated by the leaf spring 38 in the neutral direction. As shown in FIG. 1(b), the slider 57 of the rotary plate 54 is rotated at the position for conducting the right winker contact of the left/right winker switching contacts 59 of the substrate 58 to intermittently flash the right winker.

Next, the unlocking operation of the winker will be described. When an unlock signal is generated by means of the rotatable returning of the steering wheel to energize the solenoid 33, the actuation shaft 37 is retreated downward in FIG. 2, and the actuation piece 34 is also moved downward. Thus, the unlocking member 28 from the state in FIG. 1(b) is slid downward while being guided through the insertion hole 27 and the guide hole 36 by the actuation piece 34. Then, since the right lower end of the contacting portion 32 of the unlocking member 28 is contacted with the right upper end of the cam 25, the winker operation lever 13 is rotated clockwise as shown in FIG. 1(c) upon downward movement of the unlocking member 28. When the unlocking member 28 is further moved down, the contacting portion 32 is contacted fully with the cam 25, and the winker operation lever 13 is held at its neutral position shown in FIG. 1(a). The driving shaft 18 held in the groove 22 is moved toward its neutral position, by the rotation of the winker operation lever 13 by riding over the step 24 to be engaged with the groove 20 as shown in FIG. 4. In this manner, the right winker is released from its intermittent flashing.

Next, a lane changing operation will be described. In this case, the winker operation lever 13 shown in FIG. 4 is rotated, and the driving shaft 18 is engaged with the step 23 or 24, but does not arrive at the grooves 21 or 22 at both sides. Accordingly, the slider 57 is connected to the left/right winker switching contact so that the winker operation lever 13 is rotated to intermittently flash the left or right winker. However, when the operation force applied to the winker operation lever 13 is stopped, the winker operation lever 13 is immediately rotated from the state shown in FIGS. 1(d) and 4 toward the neutral position by the tension of the leaf spring 38 applied through the unlocking member 28 and the tension of the compression spring 17 applied through the driving shaft 18 Thus, the flashing of the left or right winker is released.

In the embodiment constructed as described above, the automatic canceling device for the winker comprises the cases 10, 11, the winker operation lever 13 rockably held in the cases 10, 11, the driving shaft 18 extensibly or contractibly provided through the compression spring 17 mounted from the lever 13, the cam 19 having grooves 20, 21, 22 and engaged with the driving shaft 18 for holding the lever 13 at neutral, right or left positions, the solenoid 33 energized by an unlock, signal, an unlocking member 28 for rotating the lever 13 in the unlocking direction in contact with the second cam unit 25 provided on the lever 13, and the leaf spring 38 engaged with the unlocking member 28 for energizing the cam 19 toward its neutral position. Accordingly, the energizing force of the leaf spring 38 is applied through the unlocking member 28 to the winker operation lever 13 to act as the force for holding the operation lever 13 at its neutral position. Therefore, the tension of the compression spring 17 for similarly holding the operation lever 13 at its neutral position without it can be held at its neutral position without fluctuation. Thus, the frictional force of the driving shaft 18 on the cam 19 is weakened enough to perform the winker operation by a touch. Further, in the unlocking operation, the driving force of the solenoid 33 needed to move the winker operation lever 13 may be small, thereby reducing the size of the solenoid 33. Since the winker operation lever 13 is rotated in its unlocking direction through the unlocking member 28 by the energization of the solenoid 33, the compression spring 17 is not pressed directly by the solenoid 33 therefore a solenoid 33 having a large force for pressing the compression spring 17 is not required. Further, since the whole contacting portion 32 of the unlocking member 28 is pressed to the cam 25 at the neutral position of operation lever 13, this position can be further stably held and prevented from fluctuating, allowing the reduction of tension of the compression spring 17, thereby lightly reducing the operating force. Since the contacting position of the cam 25 with the contacting portion 32 of the unlocking member 28 at the right position is separated from the rockable shafts 14a, 14b as shown in FIG. 1(b), the force necessary to rotate the winker operation lever 13 may be small, and because the tension of the leaf spring 38 is also applied, the energizing force of the solenoid 33 is further reduced. In this manner, the solenoid 33 can be reduced in size and cost. Thus, the automatic canceling device itself can be reduced in size and be inexpensively manufactured.

According to the present invention as described above, the winker operation lever can be held, even if the tension of the compression spring is weakened, at its neutral position without fluctuation; the compression spring is not pressed at the time of unlocking; the operating force in case of the unlocking operation is reduced to decrease the size of the solenoid, thereby reducing the size and cost of the automatic canceling device.

What is claimed is:

1. An automatic canceling device for a winker device comprising:
    a container,
    a winker operation lever rockably held by the container,
    an engaging unit extensibly or contractably provided through a compression spring mounted in the lever,
    a locking cam provided in the container for holding the lever engaged with the engaging unit at neutral, right or left positions,
    a solenoid energized by an unlock signal,
    a second cam unit provided on the lever,
    an unlocking member for rotating the lever in the unlocking direction in contact with the second cam unit provided on the lever,
    and an energizing member activated by the solenoid and engaged with the unlocking member for energizing the locking cam towards its neutral position whereby the lever returns to its neutral position.

2. An automatic canceling device for a winker device as defined in claim 1 wherein:
    the unlocking member is substantially T-shaped, and
    the energizing member is activated by the solenoid and engages with the unlocking member for applying a force to the second cam unit provided on the lever and thereby energizes the locking cam towards its neutral position.

3. An automatic canceling device for a winker device defined in claim 1 wherein the energizing member comprises:
    a leaf spring clamped to the solenoid,
    an actuation piece fixed to the unclamped end of the leaf spring and engaged with the unlocking member,
    an actuation shaft attached to the actuation piece whereby activation of the solenoid lowers downward the actuation shaft and thereby the actuation piece and the unlocking member.

4. An automatic canceling device for a winker device as defined in claim 2 wherein the energizing member comprises:
    a leaf spring clamped to the solenoid,
    an actuation piece fixed to the unclamped end of the leaf spring and engaged with the unlocking member,
    an actuation shaft attached to the actuation piece whereby activation of the solenoid lowers downward the actuation shaft and thereby the actuation piece and the unlocking member.

* * * * *